(12) United States Patent
Ono et al.

(10) Patent No.: US 6,345,022 B1
(45) Date of Patent: Feb. 5, 2002

(54) CONTROLLING APPARATUS FOR A DISK DATA READING UNIT

(75) Inventors: Takuro Ono, Komae; Koji Saito, Fukaya, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/365,846

(22) Filed: Aug. 3, 1999

(30) Foreign Application Priority Data

Aug. 7, 1998 (JP) ............................................. 10-224881

(51) Int. Cl.[7] ................................................. G11B 7/00
(52) U.S. Cl. .................... 369/47.1; 369/53.41; 369/59.1
(58) Field of Search ............................ 369/47.1, 47.14, 369/47.15, 53.1, 53.2, 53.21, 53.22, 53.23, 53.37, 53.41, 53.44, 53.45, 59.1, 59.14, 44.27, 44.29

(56) References Cited

U.S. PATENT DOCUMENTS

| | | | |
|---|---|---|---|
| 4,955,305 A | | 9/1990 | Garnier et al. |
| 5,087,978 A | | 2/1992 | Hieda |
| 5,809,007 A | * | 9/1998 | Takemura et al. ....... 369/275.3 |
| 6,021,102 A | * | 2/2000 | Seto et al. ........... 369/44.27 X |
| 6,201,777 B1 | * | 3/2001 | Tsuchiya et al. ......... 369/53.23 |

* cited by examiner

Primary Examiner—Muhammad Edun
(74) Attorney, Agent, or Firm—Oblon, Spivak, McClelland, Maier & Neustadt, P.C.

(57) ABSTRACT

There is provided a controlling apparatus for a disk data reading unit, comprises control board connected to the disk data reading unit which holds and rotates a disk storing a predetermined information and reads the predetermined information by properly moving an actuator on the disk, and controlling an operation of the disk data reading unit with forming a servo loop, and identifying section receiving a predetermined signal from the disk data reading unit so as to identify a type of the disk data reading unit.

24 Claims, 7 Drawing Sheets

CONTROLLING APPARATUS FOR A DISK DATA READING UNIT

BACKGROUND OF THE INVENTION

The present invention relates to a disk drive system which carries out recording and sound (video) reproduction with respect to optical disks such as a CD (Compact Disk), a DVD (Digital Video Disk) or the like, and in particular, to improvement of a controlling apparatus which controls controlled sections such as a disk motor, optical head or the like.

As well known, the above disk drive system is provided with various controlled sections such as a disk motor for driving an optical disk, an optical head for writing and reading a data with respect to the optical disk, a feed motor for moving the optical head in a diametrical direction of the optical disk.

Further, the disk drive system is provided with a printed circuit board which is mounted with a control circuit, a signal processing circuit, a microcomputer and the like, as control means for totally controlling the system. The aforesaid various controlled sections are connected to the printed circuit board by means of a cable, and then, are controlled.

In this case, a control by the printed circuit board for controlled sections is carried out by incorporating a servo loop such that the printed circuit board detects a performance state of the controlled sections, and makes a control information for controlling the controlled sections on the basis of the detection result, and thus, transmits the control information to the controlled sections.

By the way, in such a disk drive system, for example, even if the same kind of controlled sections (e.g., optical head, etc.) are used in accordance with a sales area, a grade of machine type or the like, there is the case of using the controlled sections having different servo characteristic and signal output characteristic.

In such a case, of course, in accordance with each characteristic of the used controlled sections, there is a need of modifying a configuration of a control circuit and a signal processing circuit which are mounted on the printed circuit board, and control programs given to a microcomputer, etc.

However, it is troublesome in a manufacturing or assembling work to prepare a printed circuit board which is set so as to make a one-to-one correspondence with respect to various characteristics of the controlled sections. Further, in the case of making an error of the combination of the controlled sections and the printed circuit board, a desired servo characteristic can not be obtained; therefore, an expected performance is not obtained. Thus, there is a problem that the aforesaid preparation is lack of practical use.

BRIEF SUMMARY OF THE INVENTION

It is an object of the present invention to provide a controlling apparatus which can readily identify a king of connected disk data reading unit with a simple construction, and further, to provide a controlling apparatus which can modify a control characteristic in accordance with the identification result.

The present invention provides a controlling apparatus for a disk data reading unit, comprises control means, connected to the disk data reading unit which holds and rotates a disk storing a predetermined information and reads the predetermined information by properly moving an actuator on the disk, for controlling an operation of the disk data reading unit by forming a servo loop; and identifying means for receiving a predetermined signal from the disk data reading unit, and identifying a type of the disk data reading unit.

With the above construction, in the present invention, a type of the disk data reading unit is identified in accordance with the predetermined signal from the disk data reading unit, and then, in accordance with the identification result, for example, it is possible to modify a control characteristic, or to display the identification result on a connected personal computer. Whereby it is very easy to connect various types of disk data reading unit so that a test is made.

Moreover, as defined in claim 18, the present invention provides a controlling apparatus wherein the aforesaid identifying means further includes storing means for storing a correction data for correcting a performance characteristic every type of the disk data reading unit in a memory area; and modifying means for receiving a focus error signal and a track error signal from a pick-up of the disk data reading unit, and identifying a type of the disk data reading unit into four on the basis of a directional polarity of these signals, and thus, modifying a performance characteristic of the control means in accordance with the correction data stored in the storing means read out on the basis of the identified result.

With the above construction, it is possible to identify four types according to the directional polarity of the focus error signal and the tracking error signal at the maximum. Then, by reading out a control characteristic data every previously inputted type corresponding to the identified type, it is possible to automatically correct the performance characteristic of the controlling apparatus corresponding to the identified type.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiment of the present invention will be described below with reference to the accompanying described below with reference to the accompanying drawings.

<Disk drive and Peripheral system>

Figure 1:
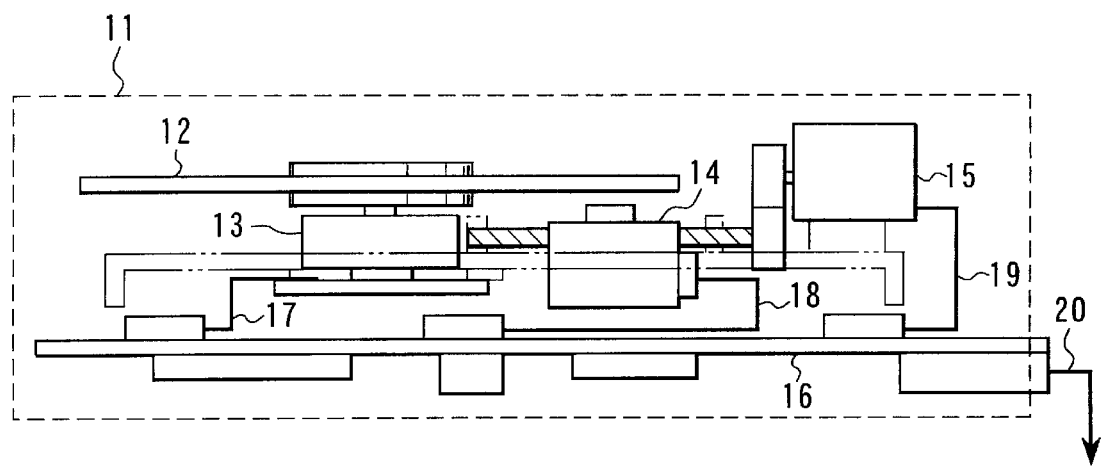
FIG. 1 shows a preferred embodiment of a controlling apparatus according to the present invention, and is a side view showing a disk reproducing device.

FIG. 1 shows a disk reproducing device 11 which is a disk drive system described in this embodiment. The disk reproducing device 11 reproduces an optical disk 12 such as a CD-ROM (Read Only Memory), for example.

The disk reproducing device 11 is provided with controlled sections such as a disk motor 13 for driving the optical disk 12, an optical pick-up 14 for reading a data from the optical disk 12, a feed motor 15 for moving the optical pick-up 14 in a diametrical direction of the optical disk 12.

Further, the disk reproducing device 11 is provided with a control/signal processing substrate 16 which is mounted with a control circuit, a signal processing circuit, a microcomputer and the like, as control means for totally controlling the device. The aforesaid disk motor 13, optical pick-up 14 and feed motor 15 are connected to the control/signal processing substrate 16 by means of cables 17, 18 and 19, and then, are controlled.

Figure 2:
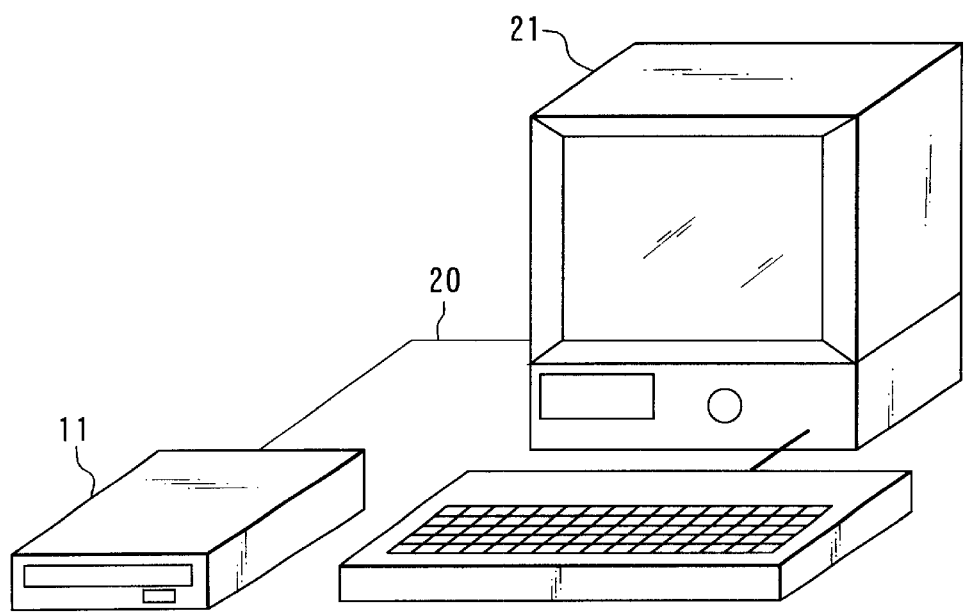
FIG. 2 is an appearance view showing a state that the disk reproducing device is connected to an external computer.

Moreover, the disk reproducing device 11 is connected to an external computer 21 via a cable 20, as shown in FIG. 2. The disk reproducing device 11 transfers recording contents of the optical disk 12 and a state of the device 11 to the computer 21 in accordance with commands outputted from the computer 21 to the control/signal processing substrate 16.

Figure 3:
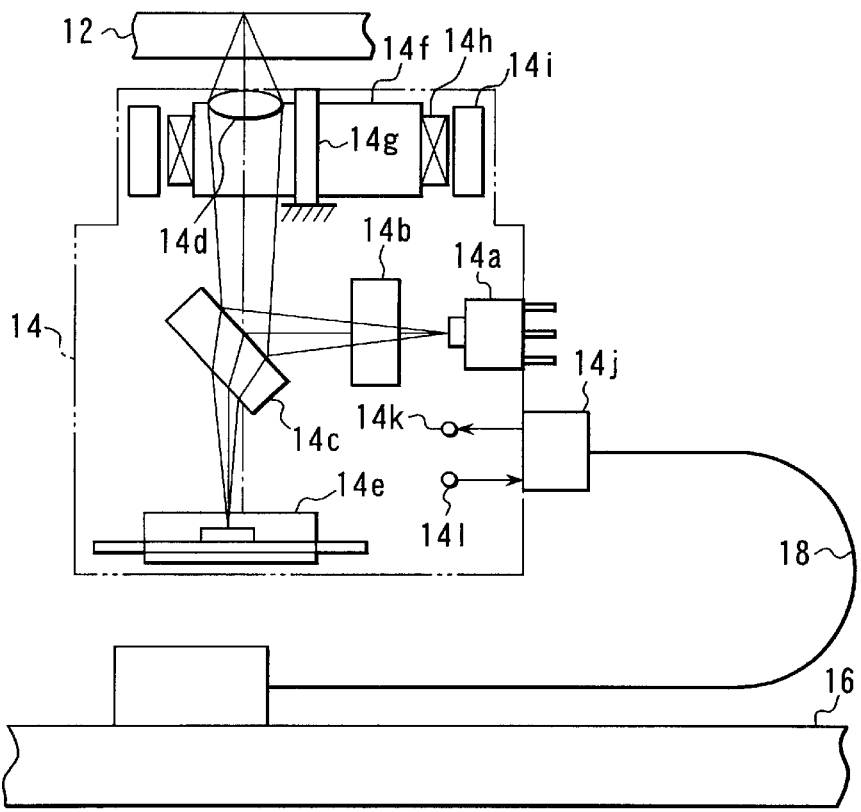
FIG. 3 is a side view showing the details of an optical pick-up of the disk reproducing device.

FIG. 3 shows the details of the above optical pick-up 14. This optical pick-up 14 guides a laser beam irradiated from a semiconductor laser 14a to an objective lens 14d via optical systems 14b and 14c, and then, converges the laser beam onto a signal recording surface of the optical disk 12.

Then, the laser beam is reflected on the signal recording surface of the optical disk 12, and moves backward through the objective lens 14d, and further, is guided to a light receiving section 14e including a photoelectric converter via the optical system 14c. Whereby an electric signal corresponding to a light receiving quantity is generated, and at this time, a data recorded in the optical disk 12 is read.

In this case, the above objective lens 14d is supported on an actuator 14f. The actuator 14f is supported to a supporting body 14g so that the objective lens 14d is movable independently in a direction (focus direction) vertical to the signal recording surface of the optical disk 12 and in a diametrical direction (tracking direction) of the optical disk 12.

The actuator 14f is controlled in its position by means of driving means comprising a coil 14h and a magnet 14i. More specifically, by applying a control current having a predetermined strength and direction flows through the coil 14h, it is possible to carry out a position control of the objective lens 14d in the focus direction and the tracking direction.

A supply of operating power to the optical pick-up 14 and a supply of control current to the coil 14h are carried out from the control/signal processing substrate 16 via the cable 18. Also, an electric signal generated in the light receiving section 14e is captured in the control/signal processing substrate 16 via the cable 18.

In this case, the optical pick-up 14 having various characteristics is selectively and removably connected to the cable 18 by means of a connector 14j. Further, the optical pick-up 14 is provided with a power terminal 14k which is connected to a power supply lead of the cable 18 so as to supply a power.

Moreover, in the optical pick-up 14, an identification signal having a predetermined level is automatically generated when a power is supplied to the power terminal 14k, and the identification signal is selected from an identification terminal 14l. A level of the identification signal is set in accordance with the characteristic of the optical pick-up 14.

The identification terminal 14l is connected to an identification lead of the cable 18. For this reason, the control/signal processing substrate 16 detects a level of the identification signal obtained from the identification lead of the cable 18, and thereby, it is possible to automatically make a decision whether the optical pick-up 14 having any characteristics is connected.

In this case, the control/signal processing substrate 16 is provided with a control circuit and a signal processing circuit which are set in accordance with each characteristic of the connected optical pick-up 14, a control program given to a microcomputer, etc. The control/signal processing substrate 16 automatically selects a control circuit, a signal processing circuit, and a control program which are set in accordance with the characteristic of the optical pick-up 14 automatically discriminated, and then, controls the connected optical pick-up 14.

In this case, there is no need of independently prepare a control circuit, a signal processing circuit and a control program given to a microcomputer, which are set in accordance with each characteristic of the connected optical pick-up 14. In fact, a component or program is partially switched, and thereby, it is possible to response to each characteristic of the optical pick-up 14.

Figure 4:
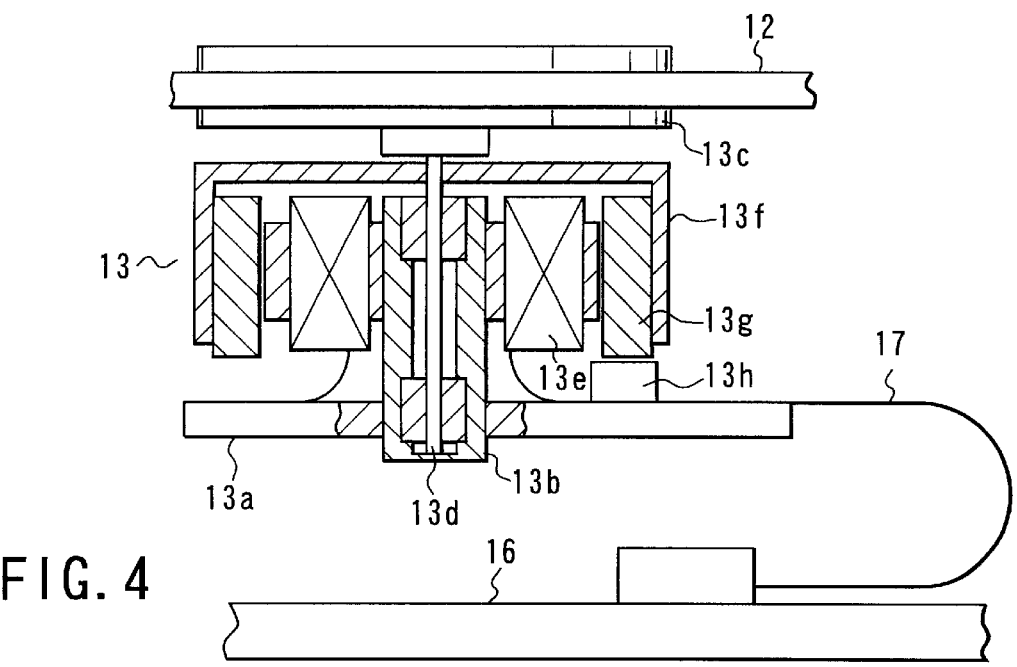
FIG. 4 is a sectional side view showing the details of a disk motor of the disk reproducing device.

Next, FIG. 4 shows the details of the above disk motor 13. The disk motor 13 is constructed in a manner that a rotary shaft 13d connected to a disk supporting member 13c for supporting the optical disk 12 is rotatably supported to a cylindrical bearing 13b vertically supported on a mounting substrate 13a.

The rotary shaft 13d is rotated by means of driving means comprising: a coil 13e supported to the bearing 13b; and a magnet 13g supported to a frame 13f which is rotated integrally with the rotary shaft 13d.

A supply of operating current to the coil 13e of the disk motor 13 is carried out from the control/signal processing substrate 16 via the cable 17. In this case, the disk motor 13 having various characteristics is selectively and removably connected to the cable 17 by means of a connector 13*h*.

Also, like the aforesaid optical pick-up 14, when a power is supplied from the control/signal processing substrate 16 connected to the cable 17, the disk motor 13 outputs an identification signal having a level corresponding to its characteristic to the control/signal processing substrate 16 via the cable 17, and then, the control/signal processing substrate 16 automatically identifies the characteristic of the disk motor 13.

Moreover, the control/signal processing substrate 16 automatically carries out a switch-over to a control circuit and a signal processing circuit which are set in accordance with the discriminated characteristic of the disk motor 13, and a switch-over to a control program which is set in the same manner.

Incidentally, the aforesaid feed motor 15 has the substantially same construction as the disk motor although is not illustrated. In the disk motor 13, there are many cases where a Hall element is used as a magnetic pole sensor for a switch-over of a coil excitation phase. However, in the feed motor 15, there are many cases where a brush is used for a switchover of the excitation phase.

In the case of the feed motor 15, like the aforesaid optical pick-up 14 and disk motor 13, when a power is supplied from the control/signal processing substrate 16 connected to the cable 19, the feed motor 15 outputs an identification signal having a level corresponding to its characteristic to the control/signal processing substrate 16 via the cable 19, and then, the control/signal processing substrate 16 automatically identifies the characteristic of the feed motor 15.

Moreover, the control/signal processing substrate 16 automatically carries out a switch-over to a control circuit and a signal processing circuit which are set in accordance with the discriminated characteristic of the feed motor 15, and a switch-over to a control program which is set in the same manner.

A predetermined potential is used as the identification signal, and directly has no relation with a function of controlled sections such as the optical pick-up 14, the disk motor 13 and the feed motor 15. For example, by taking advantage of a voltage level [H (high) level] and a ground level [L (low) level], which are obtained by applying a power supplied from the control/signal processing substrate 16 to a resistance, it is possible to identify two kinds of characteristics.

<Control section of a first embodiment of the present invention>

Figure 5A:
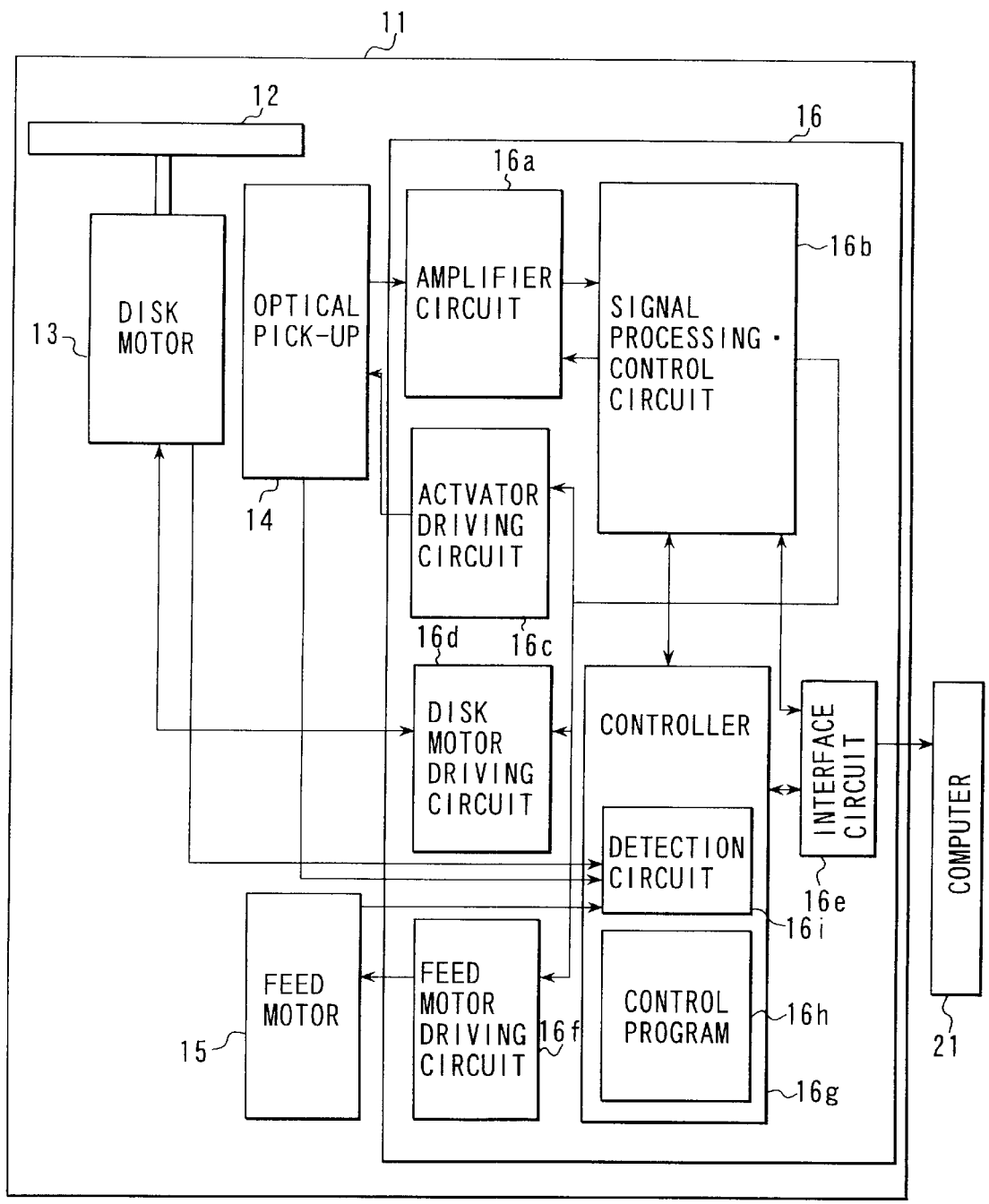
FIG. 5A is a block configuration diagram showing the details of a control/signal processing substrate of the disk reproducing device.
Figure 5B:
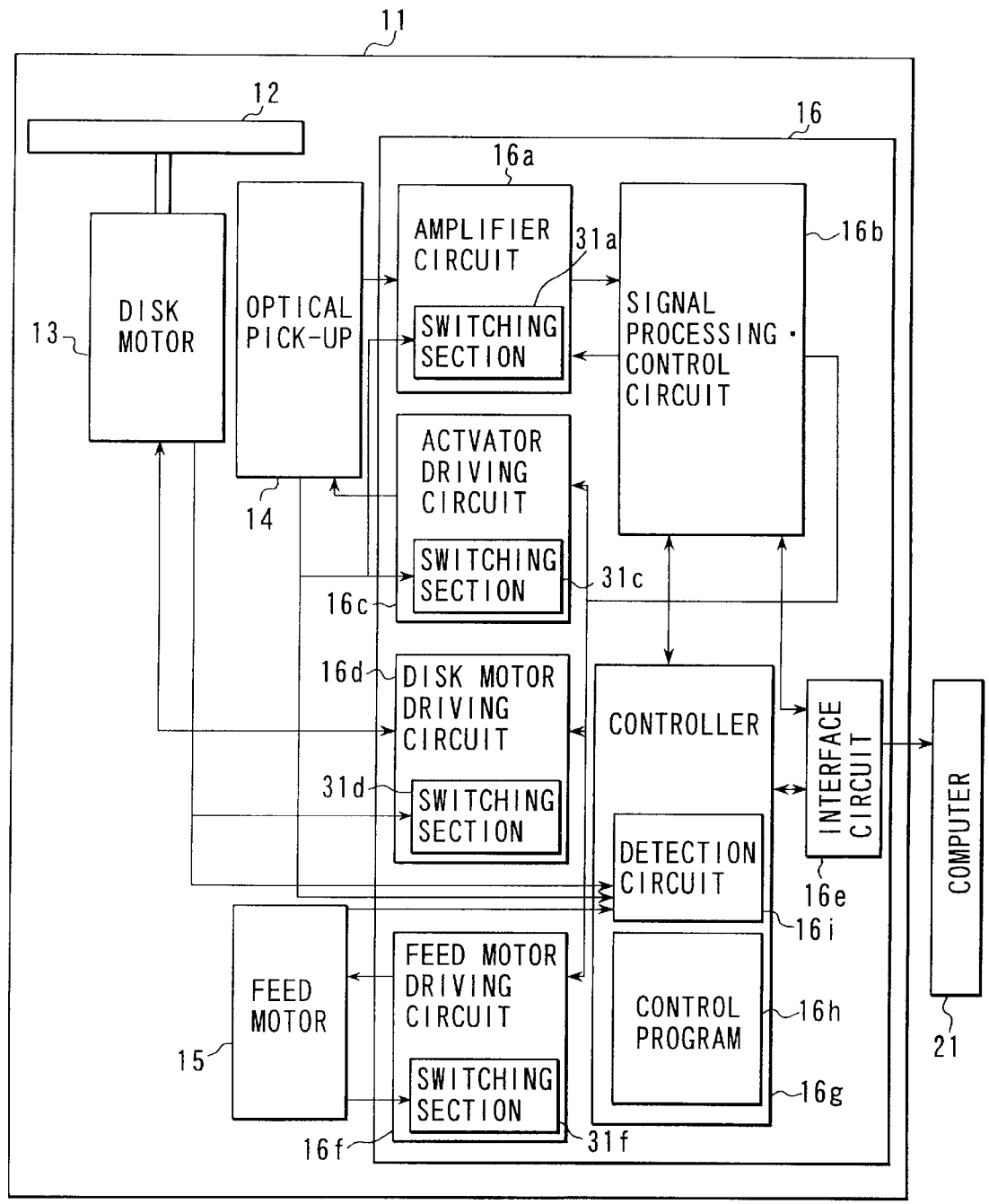
FIG. 5B is a block configuration diagram showing the disk reproducing device.

FIG. 5A and FIG. 5B show the details of the control/signal processing substrate 16. More specifically, an electric signal outputted from the light receiving section 14*e* of the optical pick-up 14 is amplified by an amplifier circuit 16*a*, and thereafter, is supplied to a signal processing/control circuit 16*b*.

The signal processing/control circuit 16*b* generates a control signal for controlling a position of the objective lens 14*d* of the optical pick-up 14 in the focus direction and the tracking direction, and a control signal for controlling a rotational speed of the optical disk 12, on the basis of an inputted electric signal.

A position control signal for the objective lens 14*d* outputted from the signal processing/control circuit 16*b* is supplied to the coil 14*h* of the optical pick-up 14 via an actuator driving circuit 16*c*, and thereby, a focus servo and a tracking servo are carried out with respect to the objective lens 14*d*.

Moreover, a rotational speed control signal of the optical disk 12 outputted from the signal processing/control circuit 16*b* is supplied to the coil 13*e* of the disk motor 13 via a disk motor driving circuit 16*d*, and thereby, a rotational speed control of the disk motor 13, that is, a rotational speed control of the optical disk 12 is carried out.

Further, the signal processing/control circuit 16*b* converts the inputted electric signal into a digital data used as information so as to carry out error correction processing or the like, and thereafter, transmits the data to the computer 21 via an interface circuit 16*e*. Thus, recording contents of the optical disk 12 are transferred to the computer 21.

In the case where a search command is issued from the computer 21, the search command is supplied to the signal processing/control circuit 16*b* via the interface circuit 16*e*. At this time, the signal processing/control circuit 16*b* generates a control signal for controlling a position of the optical pick-up 14 in a diametrical direction of the optical disk 12, on the basis of the inputted search command.

Then, the position control signal of the optical pick-up 14 outputted from the signal processing/control circuit 16*b* is supplied to a coil (not shown) of the feed motor 15 via a feed motor driving circuit 16*f*, and thereby, a position control to the diametrical direction of the optical disk 12 is carried out with respect to the optical pick-up 14.

The signal processing/control circuit 16*b* carries out the aforesaid various signal processing operations on the basis of the control of a controller 16*g* incorporating a microcomputer. Further, the signal processing/control circuit 16*b* is provided with circuit sections which are set in accordance with various characteristics of the controlled sections, and these circuit sections are selected on the basis of the control of the controller 16*g*.

The controller 16*g* stores a control program 16*h*, and controls the signal processing/control circuit 16*b* when the microcomputer is operated on the basis of the control program. The control program has a parameter corresponding to each characteristic of the controlled sections, and in accordance with identification signals outputted from the controlled sections, a necessary program parameter is selected.

More specifically, when each identification signal outputted from controlled sections such as the optical pick-up 14, the disk motor 13 and the feed motor 15 is inputted, the controller 16*g* is provided with a detection circuit 16*i* which identifies the characteristic on the basis of a level of the identification signal. Then, the control program 16*g* is selected on the basis of the detection result by the detection circuit 16*i*. Also, the detection result by the detection circuit 16*i* can be transmitted to the external computer 21 via the interface circuit 16*e*.

According to the above embodiment, in the case of connecting controlled sections such as the optical pick-up 14, the disk motor 13 and the feed motor 15 to the control/signal processing substrate 16 via cables 18, 17 and 19, these controlled sections automatically generates an identification signal indicative of self-characteristic. Further, the control/signal processing substrate 16 identifies the characteristic of the connected controlled sections on the basis of the inputted identification signal, and the circuit is set and the control program is switched over so as to correspond to the characteristic. Therefore, it is possible to accurately and readily carry out a control with respect to the controlled sections in accordance with their characteristics with a simple configuration.

FIG. 5B is a block configuration diagram showing the details of a control/signal processing substrate of the disk reproducing device. In FIG. 5B, an identification signal is not supplied to the control section 16g, but is directly supplied to each control unit. More specifically, the identification signal from the optical pick-up 14 is directly supplied to a switching section 31a of the amplifier circuit 16a and a switching section 31c of the actuator driving circuit 16c. Further, the identification signal from the disk motor 13 is directly supplied to a switching section 31d of the disk motor driving circuit 16d; on the other hand, the identification signal from the feed motor 15 is directly supplied to a switching section 31f of the feed motor driving circuit 16f.

With the above construction, a unit identification signal is directly supplied to a driver so as to operate switching sections 31a, 31c, 31d and 31f for directly modifying performance characteristic or the like. By doing so, it is possible to more securely and rapidly modify performance characteristic without being affected by a rise-up or working speed of the controller 16g. To give an example of the performance characteristic modified at this time, the following performance characteristics are modified in accordance with a kind of unit. More specifically, the performance characteristics includes: an amplification factor of the track error signal in the amplifier circuit 16a; a driving gain signal in the actuator driving circuit 16c; a rotational speed Hall output gain in the disk motor driving circuit 16d; and a driving gain in the feed motor driving circuit 16f.

<Second embodiment of the present invention (Practical application of focus error signal and tracking error signal)>

In this second embodiment, the identification signal is not newly generated as the above first embodiment, but a connected unit is identified with the use of a polarity of an existing signal (in this case, focus error signal and tracking error signal) supplied from a disk drive unit, and then, in accordance with the identification result, a control example of control units will be described in detail below.

First, the following is a description on an example of identifying a unit with the use of a polarity of a focus error signal from the optical pick-up 14.

More specifically, when the optical disk 12 is rotated, an axial runout is generated due to factors such as a tilt in a loading state, a deflection (warp) of disk itself. For this reason, in order that a distance between the objective lens 14d and a signal recording surface of the optical disk 12 is always set within a focal depth of the objective lens 14d, there is a need of carrying out a focus servo for controlling the objective lens 14d in the focus direction in accordance with the axial runout of the optical disk 12.

Figure 6:
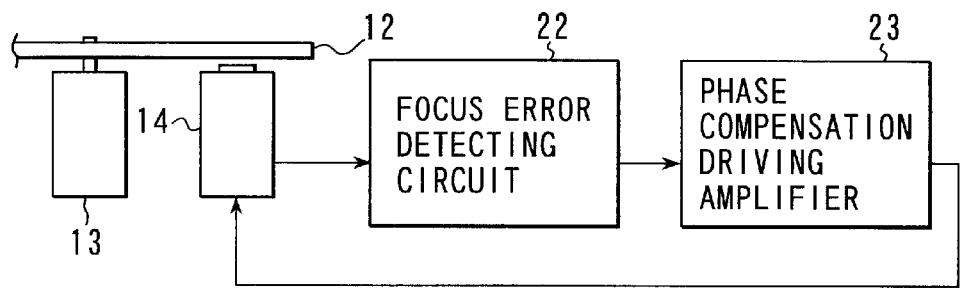
FIG. 6 is a block configuration diagram showing a focus servo system using an astigmatism method.

FIG. 6 shows a focus servo means using an astigmatism method. More specifically, an electric signal outputted from the optical pick-up 14 is supplied to a focus error detecting circuit 22, and then, is generated as a focus error signal. Then, on the basis of the focus error signal, a control signal for restricting a focus error is generated by means of a phase compensation driving amplifier circuit 23, and is supplied to the coil 14h of the optical pick-up 14.

Figure 7:
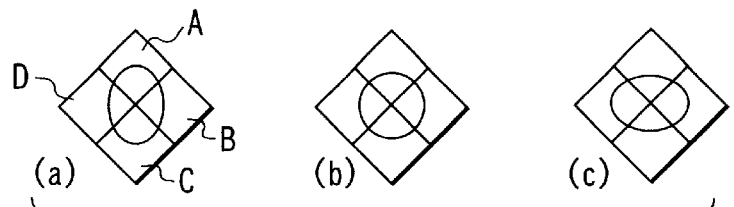
FIG. 7 is a view to explain a generative operation of a focus error signal in the focus servo system.

In the astigmatism method, as shown in FIG. 7, a light receiving region of the light receiving section 14e of the optical pick-up 14 is divided into four, that is, light receiving regions A, B, C and D. A spot when a reflected light from the optical disk 12 is incident upon the light receiving section 14e, is formed into the following shapes. More specifically, the spot becomes an ellipse as shown in FIG. 7(a) when the objective lens 14d is situated on a position near to the optical disk 12 rather than an in-focus position, becomes a true circle as shown in FIG. 7(b) when the objective lens 14d is situated on an in-focus position with respect to the optical disk 12, and becomes an ellipse as shown in FIG. 7(c) when the objective lens 14d is situated at a position far from the optical disk 12 rather than the in-focus position.

Figure 8:
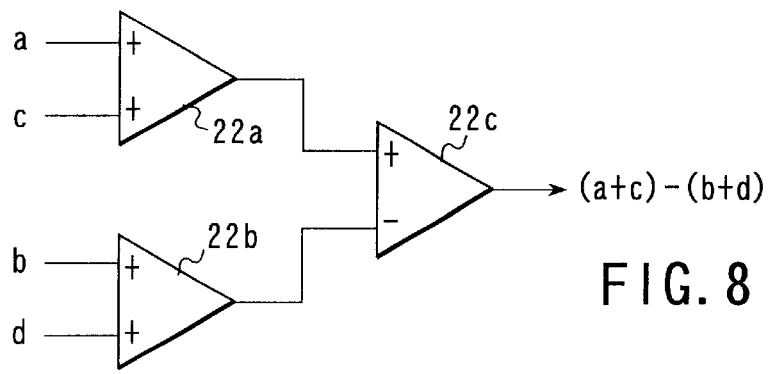
FIG. 8 is a block configuration diagram showing the details of a focus error detecting circuit in the focus servo system.

In the focus error detecting circuit 22, a focus error signal is generated in the following manner. More specifically, on the basis of output signals a, b, c, and d obtained from four light receiving regions A, B, C and D of the light receiving section 14e, an adder circuits 22a and 22b and a subtracter circuit 22c make an operation of (a+b)−(b+d), as shown in FIG. 8.

Figure 9:
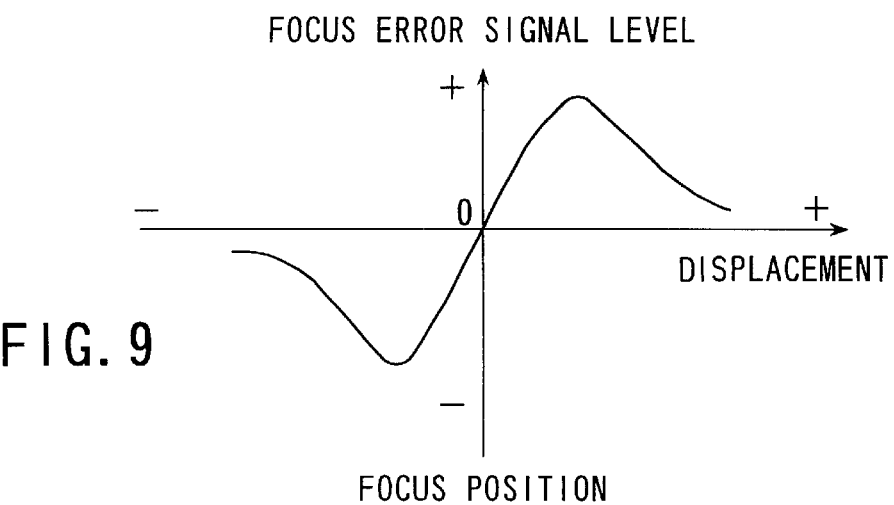
FIG. 9 is a view showing a focus error signal in the focus servo system.

In this case, as shown in FIG. 9, the focus error signal has a positive polarity when the objective lens 14d is situated on a position near to the optical disk 12 rather than an in-focus position, becomes a level "0" when the objective lens 14d is situated on an in-focus position with respect to the optical disk 12, and has a negative polarity when the objective lens 14d is situated at a position far from the optical disk 12 rather than the in-focus position. The more the objective lens comes near to or is far from the optical disk 12, the higher an absolute level of the focus error signal is.

Moreover, in the case where the objective lens 14d is moved in the focus direction in a narrow range (e.g., a range of about 10 $\mu$m in a CD-ROM optical pick-up) holding the in-focus position, the absolute level of the focus error signal varies linearly with respect to the moving distance. However, in the case where the objective lens 14d is greatly shifted from the in-focus position, the absolute level of the focus error signal decreases.

For this reason, just after the optical disk 12 is loaded in the disk reproducing device 11, in order to transfer the objective lens 14d from a state that a distance between the optical disk 12 and the objective lens 14d is greatly shifted to a focus servo state, there is a need of carrying out a focus search such that the objective lens 14d is greatly moved from the initial position to the focus direction so as to come near to the in-focus position. A waveform of the focus error signal measured in the focus search becomes an S-letter curved line as shown in FIG. 9.

So, in the optical pick-up 14, in the case where the light receiving section 14e or the driving means for moving the objective lens 14d to the focus direction has different polarity and is selectively used, when carrying out a focus search by applying a driving current of the identical direction to the coil 14h, the polarity of the S-letter curved line of the focus error signal obtained at that time becomes reverse. Thus, it is possible to use the aforesaid fact as an identification signal for identifying two kinds of characteristics.

For example, if the following information is previously given to the control program 16h of the controller 16g; more specifically, a relatively large track error amplification factor is given to the optical pick-up 14 having a positive polarity; on the other hand, a small track error amplification factor is given to the optical pick-up 14 having a negative polarity, after the optical pick-up 14 is connected and starts up, the optimal performance characteristic of each control unit is automatically adjusted. Moreover, programs or components may be selected in accordance with a kind of units such as the identified optical pick-up 14.

Next, the following is a description on another example of identifying a unit such as the optical pick-up 14 with the use of a polarity of a tracking error signal from the optical pick-up 14.

More specifically, when the optical disk 12 is rotated, in addition to an axial runout, a track runout in a radius direction is generated due to factors such as an eccentricity of disk. For this reason, there is a need of carrying out a tracking servo for always controlling the objective lens 14d in a tracking direction in accordance with the eccentricity of the optical disk 12.

Figure 10:
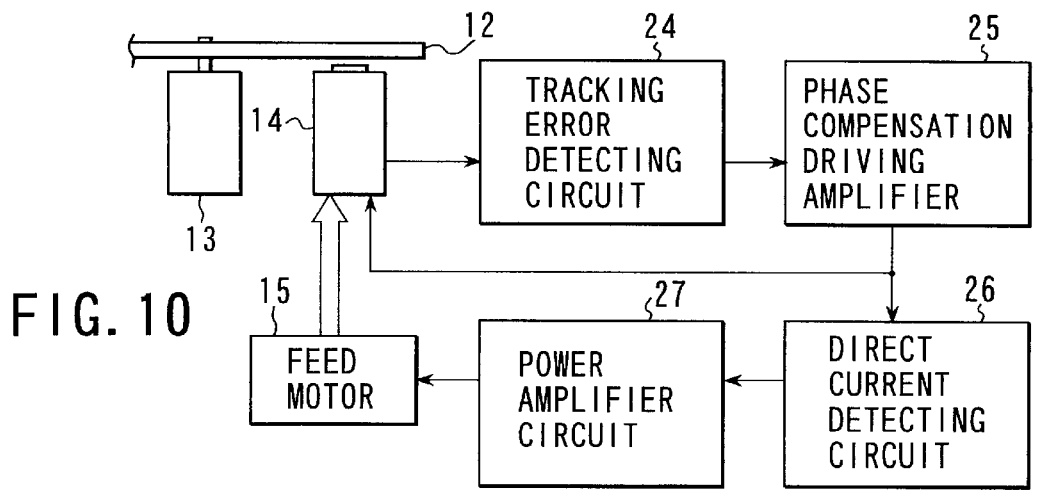
FIG. 10 is a block configuration diagram showing a tracking servo system using a three-beam method.

FIG. 10 shows a tracking servo means using a three-beam method. More specifically, an electric signal outputted from the optical pick-up 14 is supplied to a tracking error detecting circuit 24, and then, is generated as a tracking error signal. Then, on the basis of the tracking error signal, a control signal for restricting a tracking error is generated by means of a phase compensation driving amplifier circuit 25, and is supplied to the coil 14h of the optical pick-up 14.

An output from the phase compensation driving amplifier circuit 25 is supplied to the feed motor 15 via a direct current detecting circuit 26 and a power amplifier circuit 27, and is used for moving the optical pick-up 14 itself to the tracking direction with the tracking servo with respect to the objective lens 14d.

Figure 11A:
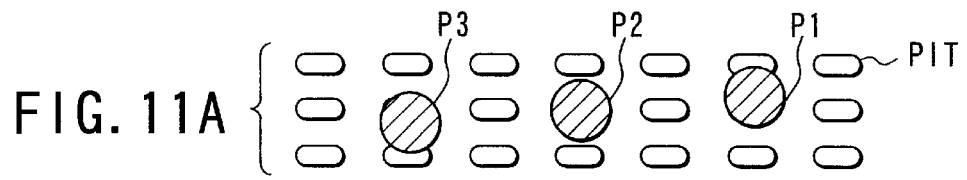
FIGS. 11A and 11B are views to explain a generative operation of a tracking error signal in the tracking servo system.

In the three-beam method, as shown in FIG. 11A, a laser beam irradiated from the semiconductor laser 14a is divided by means of a diffraction grating into three beams, and three beam spots P1, P2 and P3 are formed on the optical disk 12 by means of the objective lens 14d. The middle beam spot P2 is a main beam spot for tracing a track so as to read a signal, and each of beam spots P1 and P3 before and after the beam spot P2 is a sub-beam spot for generating a tracking error signal. Each of two sub-beam spots is shifted by ¼ of a track pitch in a direction reverse to the tracking direction with respect to the main beam spot position.

Figure 11B:
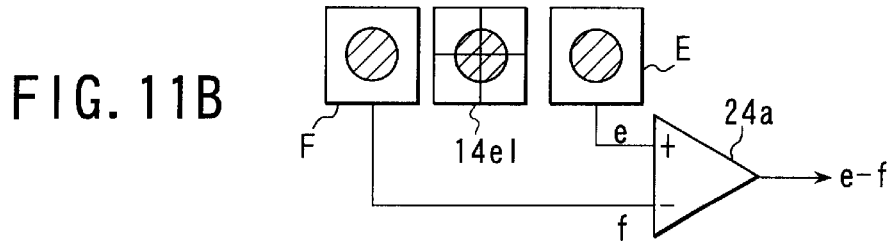

As shown in FIG. 11B, the main beam reflected by the optical disk 12 is incident upon a main light receiving section 14e1, and then, is converted into an electric signal. On the other hand, two sub-beams reflected by the optical disk 12 are respectively incident upon sub light receiving sections E and F, and then, are converted into electric signals.

In this case, a strength of the reflected light from the optical disk 12 increases when the beam spot is shifted from a pit. For this reason, in the tracking error detecting circuit 24, on the basis of output signals e and f from sub light receiving sections E and F, a subtracter circuit 24a makes an operation of e−f so as to generate a tracking error signal.

Figure 12:
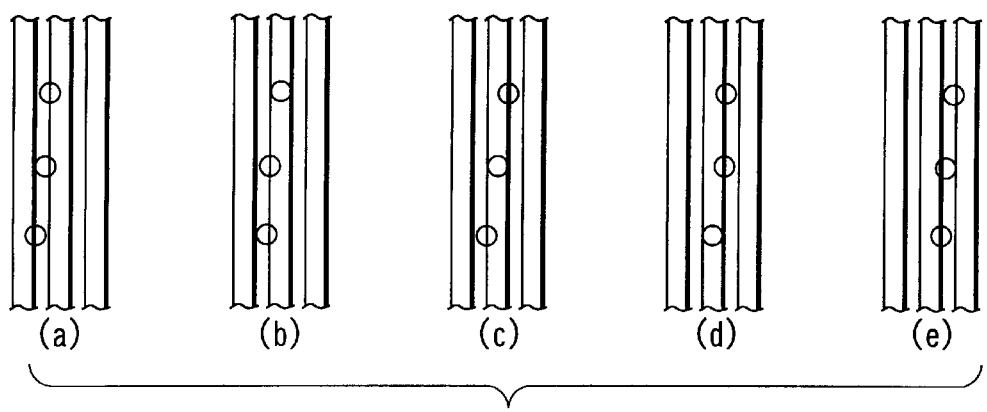
FIG. 12 is a view showing a relationship between a light beam and a track in the tracking servo system.
Figure 13:
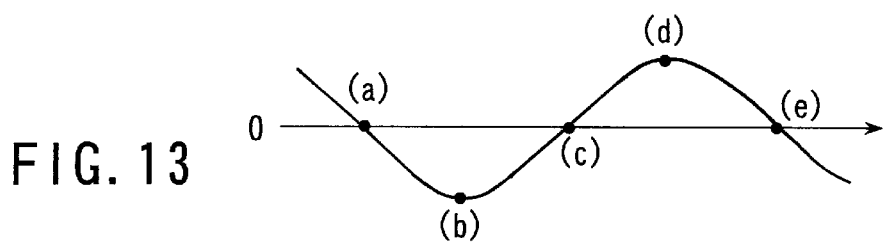
FIG. 13 is a view showing a tracking error signal in the tracking servo system.

The tracking error signal thus generated has a level change as shown in points (a) to (e) of FIG. 13 when the sub-beam spot is situated on positions (a) to (e) in FIG. 12. More specifically, an absolute level of the tracking error signal is "0" when the main beam is situated on a track, increases when the main beam is shifted from the track, and becomes the maximum when the main beam is shifted by ½ of a track pitch. Further, the absolute level of the tracking error signal decreases when the main beam is shifted, and again becomes "0" when the main beam is shifted to an adjacent track.

The polarity of the tracking error signal becomes reverse by a shift direction of the main beam. By making use of this characteristic, in the optical pick-up 14, if a polarity of the light receiving section 14e or a polarity of the driving means for moving the objective lens 14d to the tracking direction is set in reverse, it is possible to use the tracking error signal as an identification signal for identifying two kinds of performance characteristics.

For example, if the following information is previously given to the control program 16h of the controller 16g; more specifically, a relatively large track error amplification factor is given to the optical pick-up 14 generating a tracking error signal having a positive polarity; on the other hand, a small track error amplification factor is given to the optical pick-up 14 generating a tracking signal having a negative polarity, after the optical pick-up 14 is connected and starts up, the optimal performance characteristic of each control unit is automatically adjusted. Moreover, like the case of the application of the focus error signal, programs or components may be selected in accordance with a kind of units such as the identified optical pick-up 14.

Figure 14:
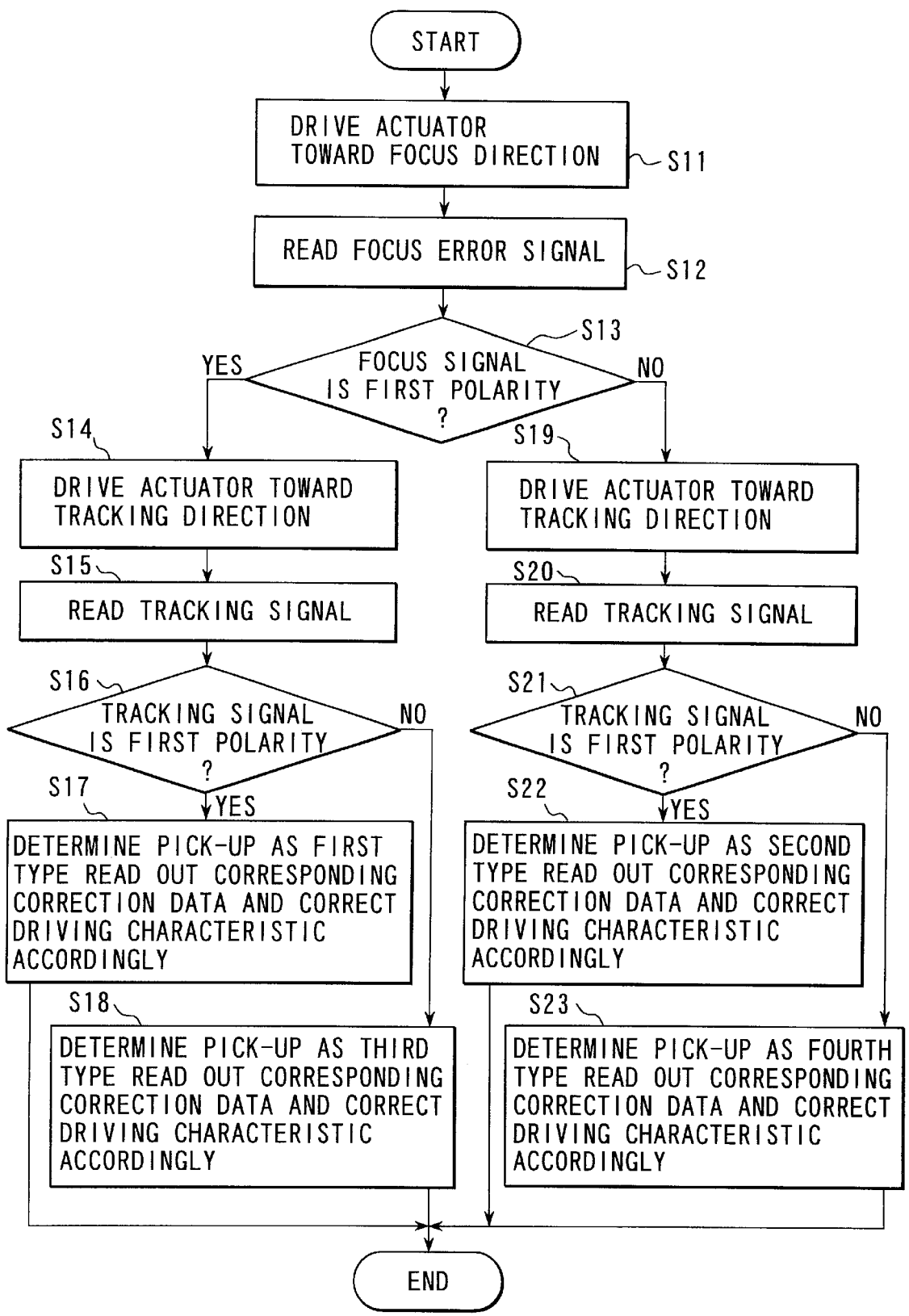
FIG. 14 is a flowchart showing an operation for identifying a disk data reading unit into four types in accordance with a directional polarity of the focus error signal and the tracking error signal, and making correction.

Further, as shown in FIG. 14, it is possible to identify four kinds of unit at the maximum by combining identification results of both focus error signal and tracking error signal.

In FIG. 14, the following procedures are carried out. More specifically, an actuator is driven toward the focus direction (S11), and a focus error signal is read (S12). Then, a polarity of the focus error signal is determined (S13). Next, the actuator is driven toward the tracking direction (S14, S19), and the tracking signal is read (S15, S20), and thus, a polarity of the focus error signal is determined (S16, S21). As described above, it is possible to identify four kinds of unit at the maximum by combining the polarity of these focus error signal and tracking error signal. Further, the optimal adjusting value is previously determined by measurement, and each unit is selected in accordance with identification results, and thus, these information is stored in a memory area. By doing so, it is possible to realize a correction on performance characteristic of each control unit according to the optimal adjusting value read out in accordance with the identification results.

Further, by combining three signals, that is, the identification signal using fixed H and L levels in the first embodiment, the focus error signal and the tracking error signal, it is possible to identify eight (2×2×2=8) kinds of performance characteristics.

In the aforesaid embodiments, the controlled sections have outputted the identification signal in order to identify self-servo characteristic by means of the control/signal processing substrate 16. In addition to controlled sections having different servo characteristic, multi-vendor components, vendor components having different version and the like are selectively used; for this reason, it is preferable to output an identification signal for identifying the kind as described above.

The present invention is not specially limited to the above embodiments, and various changes and modifications may be carried out within the scope of the present invention without departing from the gist of claims.

As is evident from the detailed description, according to the present invention, it is possible to provide a very preferable controlling apparatus which can accurately and readily carry out a control with respect to controlled sections in accordance with their characteristics with a simple construction. Further, according to the present invention, it is possible to provide a very preferable controlling apparatus which can accurately and readily carry out a control with respect to controlled sections in accordance with identified their characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controlling apparatus for a disk data reading unit, comprising:

control means, connected to the disk data reading unit which holds and rotates a disk storing a predetermined information and reads the predetermined information by properly moving an actuator on the disk, for controlling an operation of the disk data reading unit with forming a servo loop;

identifying means for receiving a predetermined signal from the disk data reading unit so as to identify a type of the disk data reading unit; and modifying means for modifying a control characteristic of the control means on the basis of the type of the disk data reading unit identified by the identifying means.

2. A controlling apparatus according to claim 1, wherein the identifying means includes receiving means for receiving an identification signal from the disk data reading unit via a removable connector cable.

3. A controlling apparatus according to claim 1, wherein the identifying means includes means for receiving an identification signal from the disk data reading unit, and identifying a type of the disk data reading unit so that the modifying means modifies a circuit component or program of the control means on the basis of the identification result.

4. A controlling apparatus according to claim 1, wherein the modifying means includes a switching circuit for receiving an identification signal from an optical pick-up of the disk data reading unit by an amplifier circuit for amplifying a signal received from the optical pick-up, and switching over an amplification characteristic on the basis of the received identification signal.

5. A controlling apparatus according to claim 1, wherein the modifying means includes a switching circuit for receiving an identification signal from an optical pick-up of the disk data reading unit by an actuator circuit for driving the optical pick-up, and switching over a performance characteristic of the actuator circuit on the basis of the received identification signal.

6. A controlling apparatus according to claim 1, wherein the modifying means includes a switching circuit for receiving an identification signal from an optical pick-up of the disk data reading unit by a disk motor driving circuit, and switching over a performance characteristic of the disk motor driving circuit on the basis of the received identification signal.

7. A controlling apparatus according to claim 1, wherein the modifying means includes a switching circuit for receiving an identification signal from an optical pick-up of the disk data reading unit by a feed motor driving circuit, and switching over a performance characteristic of the feed motor driving circuit on the basis of the received identification signal.

8. A controlling apparatus according to claim 1, wherein the identifying means includes means for receiving an identification signal from the disk data reading unit by a controller, and identifying a type of the disk data reading unit by a program operation on the basis of the identification signal so that the modifying means modifies a performance characteristic of the control means on the basis of the identification result.

9. A controlling apparatus according to claim 1, wherein the identifying means includes means for receiving an identification signal from the disk data reading unit by a controller, and identifying a type of the disk data reading unit by a program operation on the basis of the identification signal so that the modifying means modifies a performance characteristic of an amplifier circuit receiving a signal from the optical pick-up included in the disk data reading unit on the basis of the identification result.

10. A controlling apparatus according to claim 1, wherein the identifying means includes means for receiving an identification signal from the disk data reading unit by a controller, and identifying a type of the disk data reading unit by a program operation on the basis of the identification signal so that the modifying means modifies a performance characteristic of an actuator driving circuit for driving the optical pick-up included in the disk data reading unit on the basis of the identification result.

11. A controlling apparatus according to claim 1, wherein the identifying means includes means for receiving an identification signal from the disk data reading unit by a controller, and identifying a type of the disk data reading unit by a program operation on the basis of the identification signal so that the modifying means modifies a performance characteristic of a disk motor driving circuit included in the disk data reading unit on the basis of the identification result.

12. A controlling apparatus according to claim 1, wherein the identifying means includes means for receiving an identification signal from the disk data reading unit by a controller, and identifying a type of the disk data reading unit by a program operation on the basis of the identification signal so that the modifying means modifies a performance characteristic of a feed motor driving circuit on the basis of the identification result.

13. A controlling apparatus according to claim 1, wherein the identifying means includes means for receiving a focus error signal from the pickup of the disk data reading unit, and identifying a type of the disk data reading unit on the basis of a directional polarity of the focus error signal.

14. A controlling apparatus according to claim 1, wherein the identifying means includes means for receiving a track error signal from the pickup of the disk data reading unit, and identifying a type of the disk data reading unit on the basis of a directional polarity of the track error signal.

15. A controlling apparatus according to claim 1, wherein the identifying means includes means for receiving a focus error signal from the pick-up of the disk data reading unit, and identifying a type of the disk data reading unit on the basis of a directional polarity of the focus error signal so that the modifying means modifies a performance characteristic of the control means on the basis of the identification result.

16. A controlling apparatus according to claim 1, wherein the identifying means includes means for receiving a track error signal from the pick-up of the disk data reading unit, and identifying a type of the disk data reading unit on the basis of a directional polarity of the track error signal so that the modifying means modifies a performance characteristic of the control means on the basis of the identification result.

17. A controlling apparatus according to claim 1, wherein the identifying means includes means for receiving a focus error signal and a track error signal from the pick-up of the disk data reading unit, and identifying a type of the disk data reading unit into four on the basis of a directional polarity of these focus and track error signals.

18. A controlling apparatus according to claim 1, wherein the identifying means includes:

storing means for storing a correction data for correcting a performance characteristic every type of the disk data reading unit in a memory area; and modifying means for receiving a focus error signal and a track error signal from a pick-up of the disk data reading unit, and identifying a type of the disk data reading unit into four on the basis of a directional polarity of these signals so that the modifying means modifies a performance characteristic of the control means in accordance with the correction data stored in the storing means read out on the basis of the identified result.

19. A controlling method for a disk data reading unit, comprising:

a control process for controlling an operation of the disk data reading unit with forming a servo loop when being connected to the disk data reading unit which holds and rotates a disk storing a predetermined information and reads the predetermined information by properly moving an actuator on the disk;

an identifying process for receiving a predetermined signal from the disk data reading unit so as to identify a type of the disk data reading unit; and a modifying process for modifying a control characteristic of the control process on the basis of the type of the disk data reading unit identified at the identifying process.

20. A controlling apparatus according to claim 19, wherein:

the identifying process includes a process for receiving an identification signal from the disk data reading unit by a controller, and for identifying a type of the disk data reading unit by a program operation on the basis of the identification signal; and the modifying process includes a process for modifying a performance characteristic of an amplifier circuit receiving a signal from the optical pick-up included in the disk data reading unit on the basis of the identification result.

21. A controlling apparatus according to claim 19, wherein:

the identifying process includes a process for receiving an identification signal from the disk data reading unit by a controller, and identifying a type of the disk data reading unit by a program operation on the basis of the identification signal; and the modifying process includes a process for modifying a performance characteristic of an actuator driving circuit for driving the optical pick-up included in the disk data reading unit on the basis of the identification result.

22. A controlling apparatus according to claim 19, wherein:

the identifying process includes a process for receiving an identification signal from the disk data reading unit by a controller, and identifying a type of the disk data reading unit by a program operation on the basis of the identification signal; and the modifying process includes a process for modifying a performance characteristic of a disk motor driving circuit included in the disk data reading unit on the basis of the identification result.

23. A controlling apparatus according to claim 19, wherein;

the identifying process includes a process for receiving an identification signal from the disk data reading unit by a controller, and identifying a type of the disk data reading unit by a program operation on the basis of the identification signal; and the modifying process includes a process for modifying a performance characteristic of a feed motor driving circuit on the basis of the identification result.

24. A disk data reading system comprising:

a disk data reading unit for holding and rotating a disk storing a predetermined information, and reading the predetermined information by properly moving an actuator on the disk;

control means, connected to the disk data reading unit, for controlling an operation of the disk data reading unit by forming a servo loop; and modifying means for receiving an identification signal from the disk data reading unit, and identifying a type of the disk data reading unit so as to modify a performance characteristic of the control means on the basis of the identification result.

* * * * *